(12) United States Patent
Faber

(10) Patent No.: US 12,173,921 B2
(45) Date of Patent: Dec. 24, 2024

(54) DUCT SUPPORT DEVICE

(71) Applicant: Jeffrey Faber, Kewaskum, WI (US)

(72) Inventor: Jeffrey Faber, Kewaskum, WI (US)

(*) Notice: Subject to any disclaimer, the term of this patent is extended or adjusted under 35 U.S.C. 154(b) by 614 days.

(21) Appl. No.: 17/495,028

(22) Filed: Oct. 6, 2021

(65) Prior Publication Data

US 2022/0107113 A1 Apr. 7, 2022

Related U.S. Application Data

(60) Provisional application No. 63/088,684, filed on Oct. 7, 2020.

(51) Int. Cl.
*F16L 3/00* (2006.01)
*B25B 5/02* (2006.01)
(Continued)

(52) U.S. Cl.
CPC ............ *F24F 13/0254* (2013.01); *B25B 5/02* (2013.01); *E04G 17/18* (2013.01); *E04G 21/163* (2013.01);
(Continued)

(58) Field of Classification Search
CPC ............ A47B 2005/003; B25B 1/2457; B25B 1/2473; B25B 1/2484; B25B 3/00; B25B 5/006; B25B 5/02; B25B 5/125; B25B 5/142; B25B 5/166; B25B 7/12; B25B 7/123; B25B 9/04; E04F 21/1805; E04F 21/1822; E04F 21/185; E04G 3/22; E04G 5/041; E04G 17/18; E04G 21/163; E04G 21/165; E04G 25/02; E04G 25/063; E21F 17/02; H02G 3/263; Y10S 269/904

USPC ......... 81/347, 352, 353, 354, 355, 356, 362, 81/363, 373, 378, 383, 421; 108/149, 108/152; 138/107; 248/58, 59, 62, 65, 248/70, 72, 126, 188.6, 226.11, 228.3,
(Continued)

(56) References Cited

U.S. PATENT DOCUMENTS 1,750,819 A * 3/1930 Schaller .................... F16L 3/24
D8/380
1,784,244 A * 12/1930 Morris ...................... F16L 3/18
248/55
(Continued)

FOREIGN PATENT DOCUMENTS

CN 111962839 A * 11/2020 .......... E04F 21/1838

*Primary Examiner* — Kenneth Rinehart
*Assistant Examiner* — Richard K. Durden
(74) *Attorney, Agent, or Firm* — Boudwin Intellectual Property Law; Daniel Boudwin

(57) ABSTRACT

A duct support device is provided. The device includes a clamp assembly having a channel dimensioned to removably secure to a support structure, wherein a width of the channel is selectively adjustable via actuation of a pair of clamp handles affixed to the clamp assembly. A first arm member is affixed to the clamp assembly at a proximal end of the first arm member. A second arm member is pivotally affixed to a distal end of the first arm member. A third arm member is perpendicularly affixed to a distal end of the second arm member. A brace is affixed to the third arm member parallel to a longitudinal axis of the third arm member, wherein the brace extends along a length of an upper side of the third arm member. In some embodiments, a fourth arm member is perpendicularly affixed to a distal end of the third arm member.

15 Claims, 5 Drawing Sheets

(51) Int. Cl.
*E04G 17/18* (2006.01)
*E04G 21/16* (2006.01)
*F16L 3/24* (2006.01)
*F16M 13/02* (2006.01)
*F24F 13/02* (2006.01)
*B25B 1/24* (2006.01)
*B25B 5/00* (2006.01)
*B25B 5/16* (2006.01)
*B25B 7/12* (2006.01)
*E04F 21/18* (2006.01)
*E04G 21/18* (2006.01)
*H02G 3/00* (2006.01)

(52) U.S. Cl.
CPC ............. *F16L 3/006* (2013.01); *B25B 1/2473* (2013.01); *B25B 5/006* (2013.01); *B25B 5/166* (2013.01); *B25B 7/123* (2013.01); *E04F 21/1822* (2013.01); *E04G 21/165* (2013.01); *E04G 21/1841* (2013.01); *F16L 3/24* (2013.01); *F16M 13/022* (2013.01); *F16M 2200/024* (2013.01); *H02G 3/263* (2013.01)

(58) Field of Classification Search
USPC .......... 248/228.4, 228.5, 228.6, 231.41, 320, 248/354.5; 269/46, 256, 904; 414/11, 12
See application file for complete search history.

(56) References Cited

U.S. PATENT DOCUMENTS

| | | | | |
|---|---|---|---|---|
| 2,045,307 A | * | 6/1936 | Maurice | F16L 3/00 269/296 |
| 2,358,865 A | * | 9/1944 | Mcpherson | E04F 21/1805 248/188.7 |
| 2,408,719 A | * | 10/1946 | Abernethy | E04G 5/041 248/317 |
| 2,417,013 A | * | 3/1947 | Petersen | B25B 7/123 81/356 |
| 2,889,145 A | * | 6/1959 | Hoffman | F24F 13/0254 269/68 |
| 3,017,174 A | * | 1/1962 | Reuter | E04G 21/163 269/97 |
| 3,020,041 A | * | 2/1962 | Peterson | B25B 1/24 269/274 |
| 3,219,337 A | * | 11/1965 | Hagen, Jr. | H02G 3/263 269/309 |
| 3,521,519 A | * | 7/1970 | Chester | F16C 11/04 74/519 |
| 3,589,682 A | * | 6/1971 | Dickey | E04G 21/3233 256/65.1 |
| 3,870,268 A | * | 3/1975 | Larkin | E04G 25/063 403/107 |
| D256,216 S | * | 8/1980 | Van Horn | 269/46 |
| 4,302,989 A | * | 12/1981 | Tolksdorf | E04F 21/185 81/421 |
| 4,646,996 A | * | 3/1987 | Comstock | B66F 19/00 248/371 |
| 5,644,960 A | * | 7/1997 | O'Brien | B25B 13/26 81/367 |
| 5,979,854 A | * | 11/1999 | Lundgren | E04F 21/1805 248/354.3 |
| 6,098,942 A | | 8/2000 | Heath | |
| 6,155,547 A | * | 12/2000 | Gatanas | B25B 7/123 269/6 |
| 6,402,096 B1 | | 6/2002 | Ismert et al. | |
| 6,463,961 B1 | | 10/2002 | Iizuka | |
| 6,595,471 B1 | | 7/2003 | Botting | |
| 6,729,587 B1 | | 5/2004 | White | |
| 6,932,334 B1 | * | 8/2005 | Gregory | B25B 5/06 269/46 |
| 8,469,427 B1 | * | 6/2013 | Mejia | E04F 21/1805 294/209 |
| 9,982,802 B1 | * | 5/2018 | Patterson | F24F 13/32 |
| 10,307,898 B2 | * | 6/2019 | Lin | B25B 5/02 |
| 11,204,232 B2 | * | 12/2021 | Ediger | G01B 7/31 |
| 2008/0029683 A1 | * | 2/2008 | Draghici | B63H 20/36 248/640 |
| 2008/0060486 A1 | * | 3/2008 | Robert | B25B 7/123 81/367 |

* cited by examiner

DUCT SUPPORT DEVICE

CROSS REFERENCE TO RELATED APPLICATIONS

This application claims the benefit of U.S. Provisional Application No. 63/088,684 filed on Oct. 7, 2020. The above identified patent application is herein incorporated by reference in its entirety to provide continuity of disclosure.

BACKGROUND OF THE INVENTION

The present invention relates to duct installation tools. More particularly, the present invention pertains to a duct support device configured to affix to a joist or other support structure and maintain ductwork in a desired position while the duct is installed.

Many contractors and construction workers install ductwork when assembling a building, however installing ductwork can be an extremely burdensome and difficult process. Due to the weight and bulk of ductwork, the installation process typically requires multiple workers to provide adequate support for the ductwork while it is secured to the building frame. Often, additional securement and stabilization is required, including chains or cables to provide additional support. Without proper support, the ductwork can become damaged as the unsupported weight may cause the ductwork to bend and distort, requiring repair or replacement.

Furthermore, utilizing multiple individuals to install ductwork can be an unattractive solution from a cost-efficacy standpoint. Additionally, the overall efficiency of construction may be impacted from extended use of additional individuals in the ductwork installation process. Often, many of the additional workers required are merely providing support to the ductwork while another individual installs the ductwork, rather than performing other necessary construction tasks. Alternatively, replacing individual labor with a system of support cables or chains is a time-consuming process that requires a significant outlay of time and effort initially, further impacting efficiency of installation. Therefore, a duct support system that can be quickly and efficiently affixed to a support structure to support ductwork in position while a single individual installs the ductwork is desired.

In light of the devices disclosed in the known art, it is submitted that the present invention substantially diverges in design elements from the known art and consequently it is clear that there is a need in the art for an improvement to existing duct support devices. In this regard, the instant invention substantially fulfills these needs.

SUMMARY OF THE INVENTION

In view of the foregoing disadvantages inherent in the known types of duct support devices now present in the known art, the present invention provides a duct support device wherein the same can be utilized for providing convenience for the user when installing ductwork with minimal effort and manpower.

The present system comprises a clamp assembly having a channel dimensioned to removably secure to a support structure, wherein a width of the channel is selectively adjustable via actuation of a pair of clamp handles affixed to the clamp assembly. A first arm member is affixed to the clamp assembly at a proximal end of the first arm. A second arm member is pivotally affixed to a distal end of the first arm member. A third arm member is perpendicularly affixed to a distal end of the second arm member. A brace is affixed to the third arm member parallel to a longitudinal axis of the third arm member, wherein the brace extends along a length of an upper side of the third arm member. In alternate embodiments, a fourth arm member is perpendicularly affixed to a distal end of the third arm member defining a U-shape. In such embodiments, the brace is perpendicularly affixed to a distal end of the fourth arm member, such that the brace is parallel to a longitudinal axis of the third arm member.

In some embodiments, the brace comprises a larger cross-sectional area than the upper end of the third arm member. In another embodiment, a locking pin is removably securable through coaxially aligned apertures disposed through each of the first arm member and the second arm member, wherein the locking pin is configured to retain the first arm member at a desired angle relative to the second arm member. In other embodiments, the locking pin is affixed to the second arm member via a cable. In yet another embodiment, the brace extends along a length greater than half of a length of the third arm member. In some embodiments, a pad is affixed to an upper surface of the brace. In another embodiment, the pad extends along an entirety of the upper surface. In other embodiments, the clamp assembly comprises a base and a pair of wall members extending from opposing ends of the base defining the channel therebetween, wherein one of the pair of wall members is slidably disposed along the base and operably connected to the pair of clamp handles. In other embodiments, a plate is affixed to an upper end of each of the pair of wall members, wherein a portion of each plate overhangs the pair of wall members, such that a distance between each plate is less than the width of the channel. In yet another embodiment, a groove is disposed on an exterior surface of one of the pair of wall members, wherein the groove is dimensioned to slidably receive the proximal end of the first arm member therein. In some embodiments, an opening extends through one of the pair of wall members, wherein the opening is dimensioned to receive a portion of one of the pair of clamp handles therethrough when the clamp assembly is in an open position. In another embodiment, a pair of pads are affixed to opposing ends of the upper surface of the brace. In other embodiments, a duct support system comprises a pair of duct supports incorporating each of the three arm member embodiment and the four arm member embodiment for supporting individual components of ductwork simultaneously.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
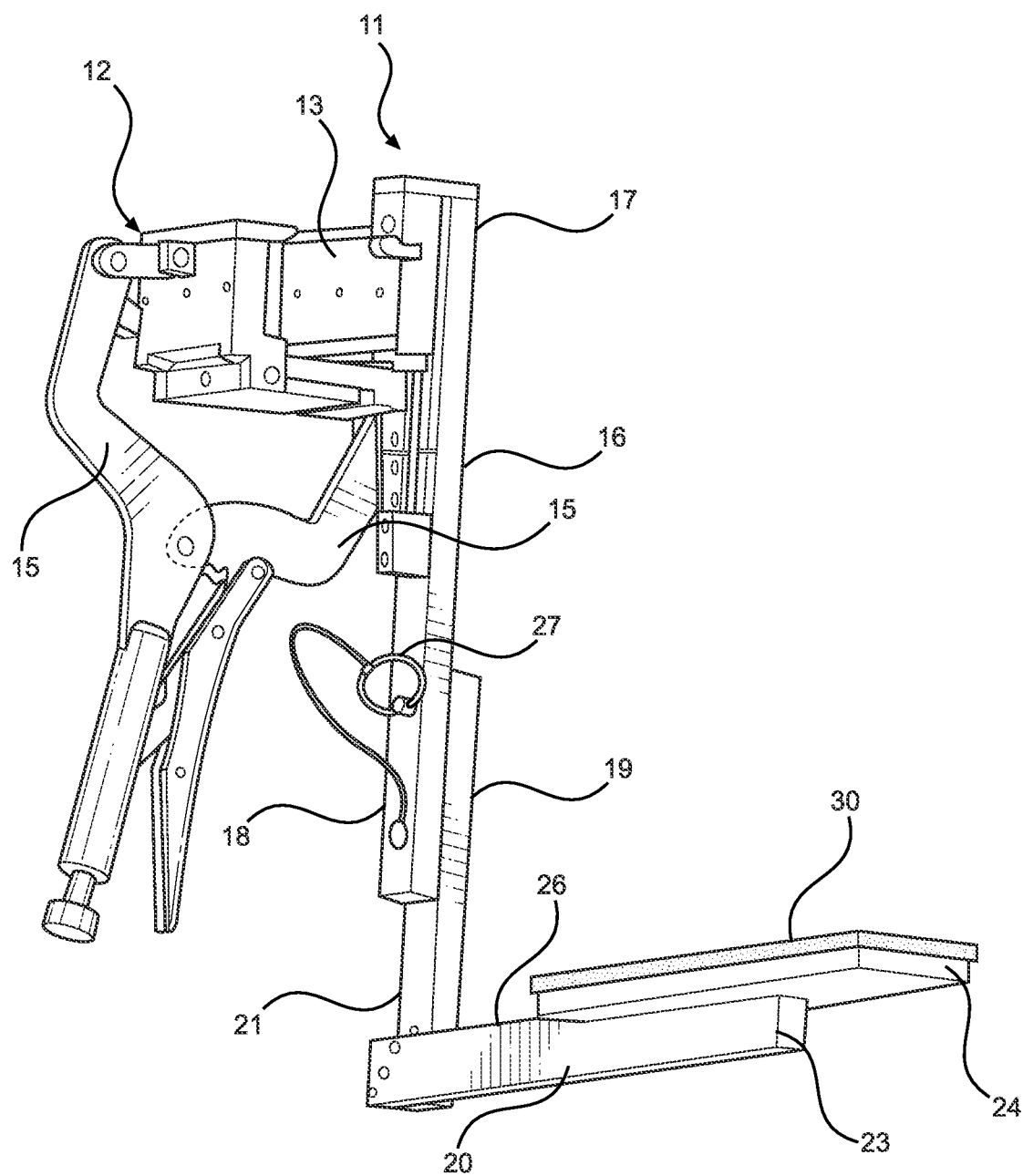
FIG. 1A shows a perspective view of an embodiment of the duct support device.

Reference is made herein to the attached drawings. Like reference numerals are used throughout the drawings to depict like or similar elements of the duct support device. The figures are intended for representative purposes only and should not be considered to be limiting in any respect.

Figure 1B:
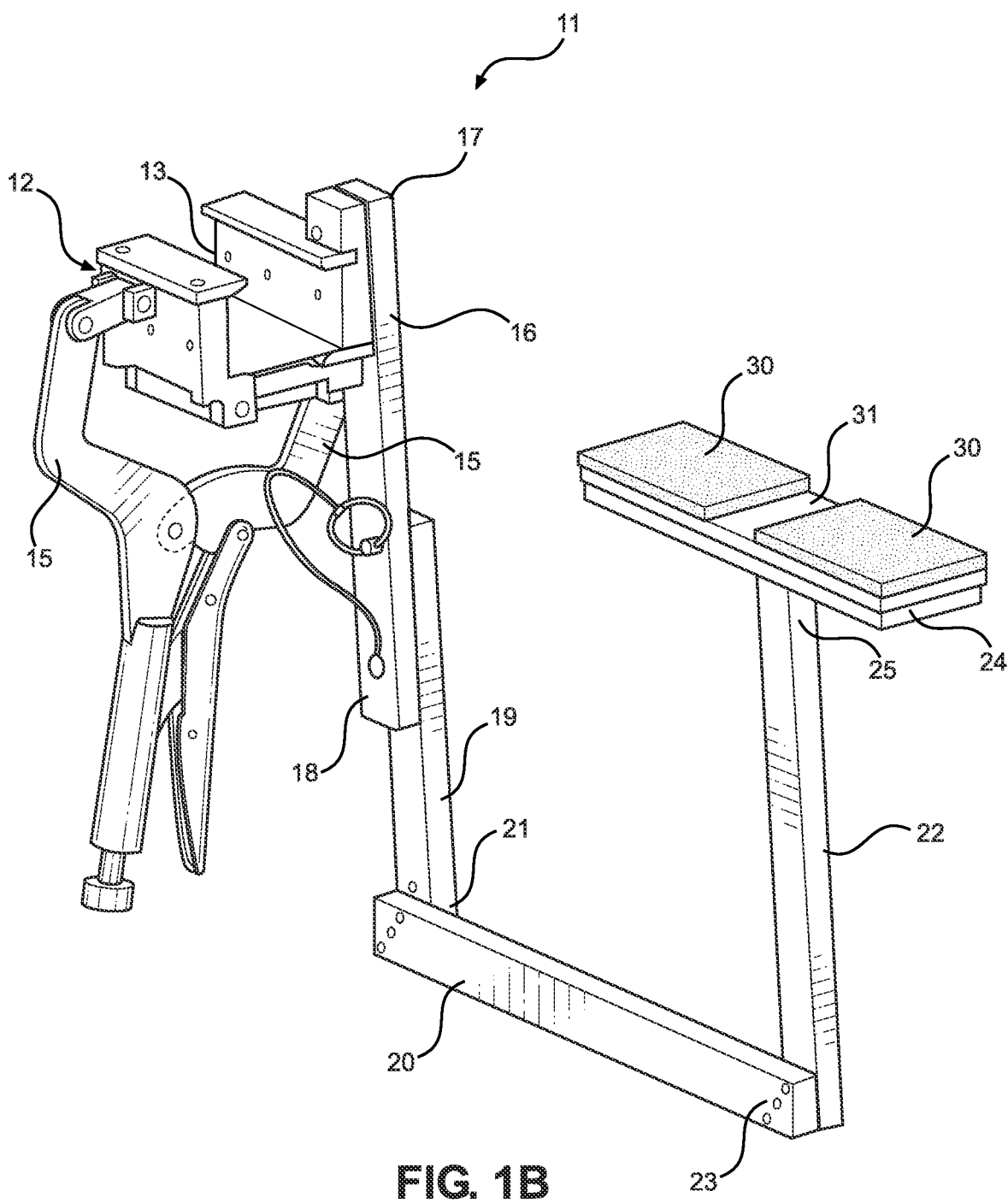
FIG. 1B shows a perspective view of an alternate embodiment of the duct support device.
Figure 4:
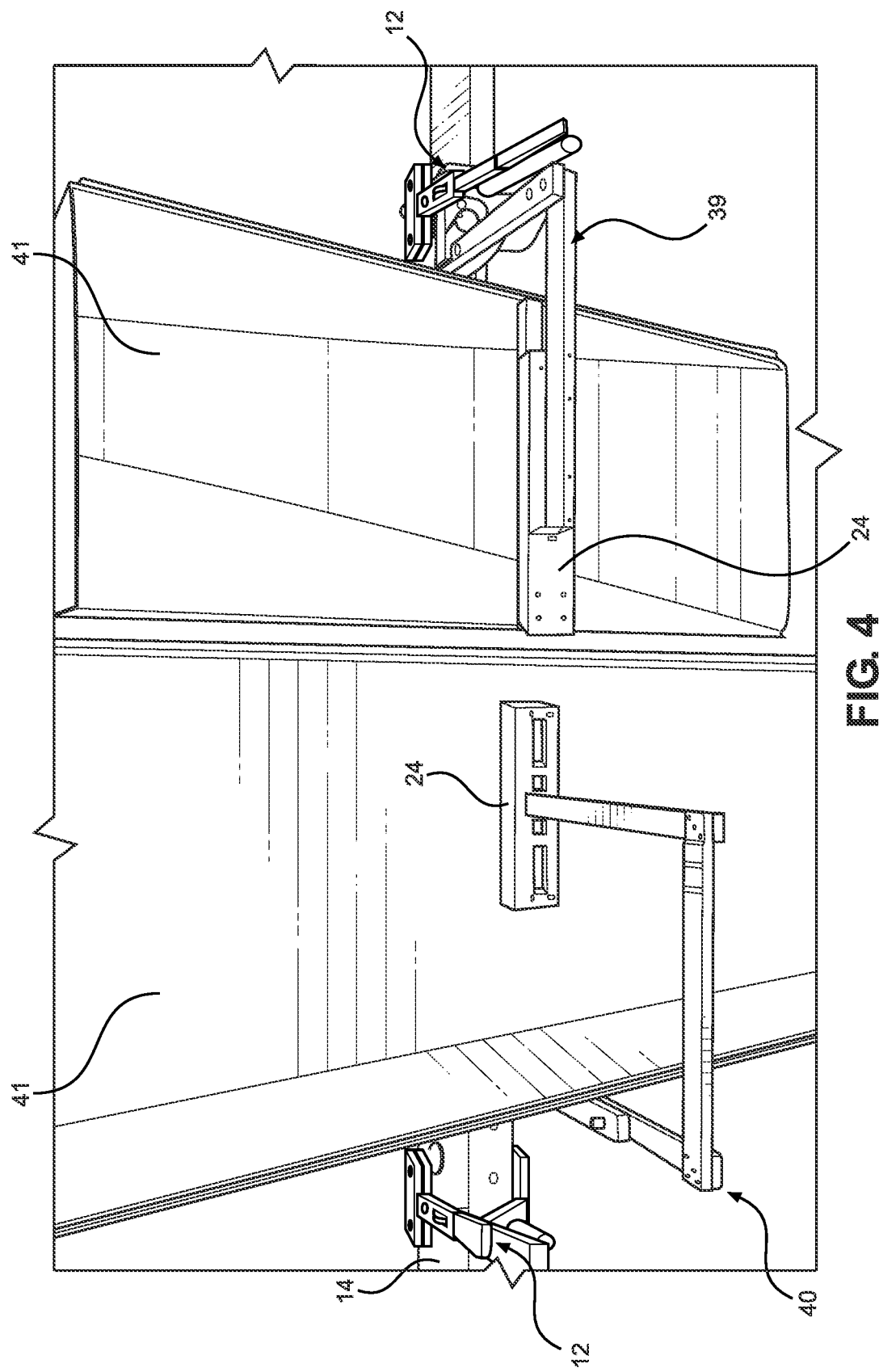
FIG. 4 shows a perspective view of various embodiments of the duct support device in use.

Referring now to FIGS. 1A and 1B, there is shown a perspective view of an embodiment of the duct support device and a perspective view of an alternate embodiment of the duct support device, respectively. The duct support device 11 comprises a clamp assembly 12 affixed to a plurality of arm members terminating in a brace 24, wherein the brace 24 is contemplated to retain ductwork (as shown in FIG. 4, 41) thereon while the ductwork is installed. The illustrated embodiments demonstrate two contemplated configurations for the duct support device 11, wherein each of the illustrated embodiments provides support for different types or portions of ductwork as further described elsewhere herein. The clamp assembly 12 comprises a channel 13, wherein the clamp assembly 12 removably receives a support structure, such as a joist or rafter therein, such that the duct support device 11 is retained in a desired position for use. The width of the channel 13 is selectively adjustable via actuation of a pair of clamp handles 15 pivotally affixed to the clamp assembly 12, such that the user can removably secure the duct support member 11 to support structures of various sizes. In some embodiments, the pair of clamp handles 15 are configured to lock in a closed position to retain the support structure within the channel 13.

In the illustrated embodiment of FIG. 1A, the plurality of arm members include a first arm member 16, wherein the first arm member 16 is affixed to the clamp assembly 12 at a proximal end 17 thereof. A second arm member 19 is pivotally affixed to a distal end 18 of the first arm member 16, such that the relative angle between the first and second arm members 16, 19 is selectively adjustable. In the shown embodiment, a locking pin 27 is removably securable through coaxial apertures disposed through each of the first and second arm members 16, 19 to retain the first and second arm members 16, 19 at a desired relative angle. In some such embodiments, the locking pin 27 is spring-loaded to frictionally engage an interior of each of the coaxial apertures to retain the first and second arm members 16, 19 in the desired position. In the shown embodiment, a third arm member 20 is perpendicularly affixed to a distal end 21 of the second arm member 19, such that the third arm member 20 is substantially parallel to the channel 13 and the support structure retained therein. In this manner, the ductwork can be secured in a level position relative to the building structure. In other embodiments, each arm member of the plurality of arm members may be pivotally affixed to an adjacent arm member, similar to the pivotal nature between the first and second arm members 16, 19. In this manner, the duct support device 11 can be customized to operate with a variety of building structures and ductwork styles to facilitate ductwork installation as necessary. In the shown embodiment, the brace 24 is affixed to an upper side 26 of the third arm member 20 at a distal end 23 thereof, such that the brace 24 extends along an axis parallel to a longitudinal axis of the third arm member 20. In this manner, an upper surface 31 of the brace 24 rests along a plane parallel to that of the upper side 26 to ensure level installation of ductwork resting upon the brace 24. In the illustrated embodiment, the brace 24 extends along a length of the third arm member 20 greater than half of the total length of the third arm member 20, thereby maximizing the surface area in contact with the ductwork during installation. In the shown embodiment, the brace 24 further comprises a pad 30 thereon, wherein the pad 30 is configured to minimize damage to the ductwork from the brace 24. Furthermore, the pad 30 is contemplated to comprise a high friction material, such as rubber, such that the ductwork is frictionally engaged by the pad 30 to prevent the ductwork being displaced during installation.

In the illustrated embodiment of FIG. 1B, the duct support device 11 further comprises a fourth arm member 22 perpendicularly affixed to a distal end 23 of the third arm member 20, such that the plurality of arm members define a U-shaped configuration. This configuration is particularly beneficial for engaging an interior surface of an upper portion of ductwork (as shown in FIG. 4), such that the plurality of arm members contour around the sidewalls of the upper portion of ductwork. As previously described, the fourth arm member 22 may further comprise a pivotal connection with the third arm member 20, such that the user can customize the shape and relative angle of each arm member of the plurality of arm members as needed for a particular installation. In the shown embodiment, the brace 24 is perpendicularly affixed to a distal end 25 of the fourth arm member 22 to rest flush against the interior surface of the ductwork. In the illustrated embodiment, the brace 24 further comprises a pair of pads 30 disposed on opposing ends of the brace 24, wherein the pair of pads 30 are configured to frictionally engage and cushion the ductwork thereon, to retain the ductwork in a desired position during installation. Placement of the pair of pads 30 on opposing ends of the brace 24 provides distant points of contact with the ductwork, such that the rotation of the ductwork is minimized thereby. Utilizing a pair of pads 30 rather than a singular pad 30 as shown in FIG. 1A is contemplated to reduce construction costs while minimally impacting the frictional engagement of the ductwork.

Figure 2:
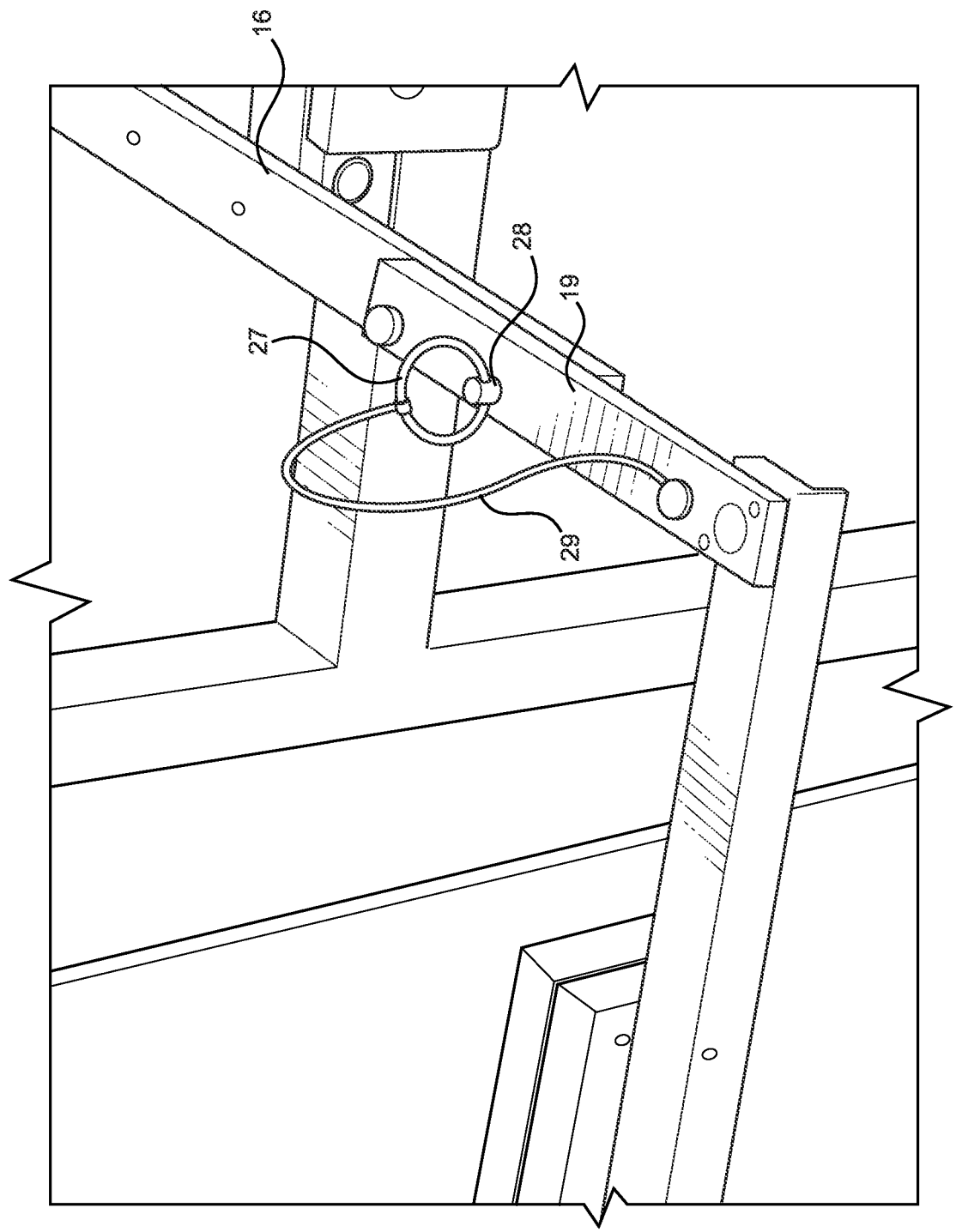
FIG. 2 shows a close-up view of the locking pin of an embodiment of the duct support device.

Referring now to FIG. 2, there is shown a close-up view of the locking pin of an embodiment of the duct support device. In the illustrated embodiment, the first arm member 16 is pivotally affixed to the second arm member 19, wherein the relative angle of the first and second arm members 16, 19 is selectively adjustable. As previously discussed, this same selectively locking pivotal arrangement is contemplated for each connection between the plurality of arms to increase flexibility, and a singular pivot point is discussed for brevity. The relative angle between the first and second arm members 16, 19 can be locked via insertion of a locking pin 27 through coaxial apertures 28 disposed through each of the first and second arm members 16, 19. In the illustrated embodiment, the locking pin 27 further comprises a ring through a base of the locking pin 27, wherein the ring provides a gripping point for the user to remove the locking pin 27 from the coaxial apertures 28. Furthermore, in the shown embodiment, the locking pin 27 is further affixed to the second arm member 19 via a cable 29, such that the locking pin 27 is retained in close proximity to the second arm member 19 to reduce the likelihood of misplacing the locking pin 27.

Figure 3:
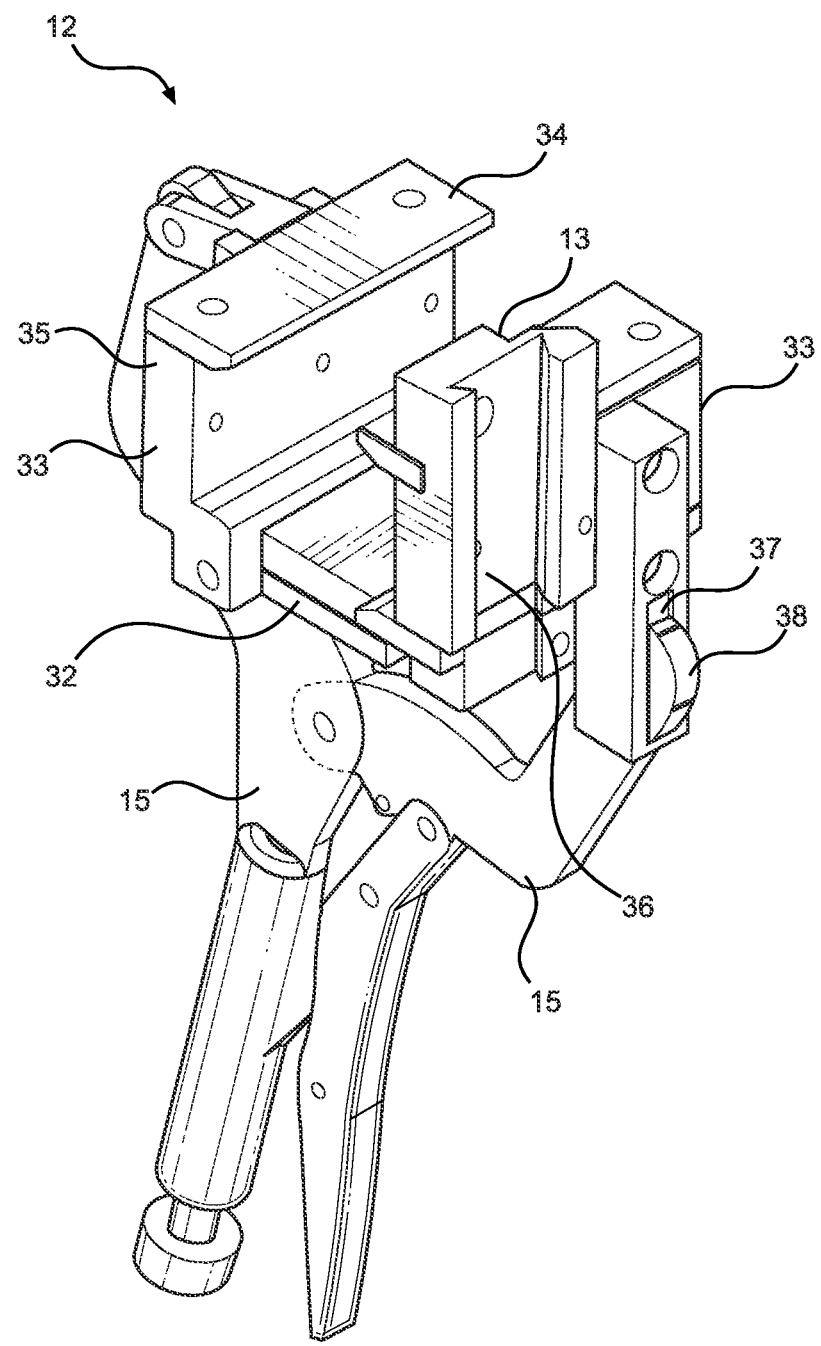
FIG. 3 shows a perspective view of the clamp assembly of an embodiment of the duct support device.

Referring now to FIG. 3, there is shown a perspective view of the clamp assembly of an embodiment of the duct support device. In the shown embodiment, the clamp assembly 12 comprises a base 32 having a pair of wall members 33 extending from opposing sides thereof, wherein one of the pair of wall members 33 is selectively movable along the base 32 to adjust a width of the channel 13 defined between the pair of wall members 33. In the shown embodiment, one of the pair of wall members 33 is slidably affixed within a track disposed on a lower side of the base 32, such that the slidable wall member 33 moves along a length of the base 32 to restrict the width of the channel 13. Furthermore, in the illustrated embodiment, a plate 34 is disposed on an upper end 35 of each of the pair of wall members 33, such that the plate 34 overhangs into the channel 13 such that a linear distance between each plate 34 is less than a linear distance between an interior surface of each wall member of the pair of wall members 33. In this manner, the plate 34 is configured to rest against a lip extending from a support structure, such as lips or flanges present on I-beams or other support structures, thereby anchoring the clamp assembly 12 to the support structure. In the shown embodiment, a distal end of each plate 34 tapers to provide a height less than a remainder of the plate 34, such that the distal end of the plate 34 can more readily bite into softer support structures, such as wooden beams. In this manner, the clamp assembly 12 can more securely affix to the support structure, thereby ensuring that the ductwork is properly supported and maintained in a desired position.

In the shown embodiment, a groove 36 is disposed on an exterior of one wall member of the pair of wall members 33, wherein the groove 36 slidably receives the proximal end of the first arm member therein. In such embodiments, the proximal end of the first arm member is dimensioned to contour to the groove 36, such that a frictional engagement with the first arm member is maximized. In this manner, the user can more securely affix the plurality of arms to the clamp assembly 12 during use. In the shown embodiment, the groove 36 comprises a pair of angled sidewalls, such that a base of the groove 36 comprises a greater width than an upper end of the groove 36. In this manner, the first arm member is retained within the groove 36 upon application of lateral forces perpendicular to the base of the groove 36. Additionally, the first arm member can be secured within the groove 36 at different positions, such that a length of the first arm member extending beyond a lower end of the clamp assembly 12 can be adjusted for a desired use. In some embodiments, additional fasteners can be inserted through the first arm member into complementary receiving apertures within the groove 36 to retain the first arm member in a desired position.

In the shown embodiment, each clamp handle of the pair of clamp handles 15 are pivotally affixed to the pair of wall members 33, such that as the pair of clamp handles 15 are actuated, the width of the channel 13 decreases. The pair of clamp handles 15 are contemplated to lock in a closed position to securely retain the support structure within the channel 13 in a hands-free manner. As shown, a bracket is affixed to at least one of the pair of wall members 33, wherein the bracket includes an opening 37 therethrough, wherein the opening 37 is dimensioned to receive an upper portion 38 of a clamp handle therethrough. In this manner, the pair of clamp handles 15 are freely pivotable through the bracket, such that the bracket does not interfere with actuation of the pair of clamp handles 15.

Referring now to FIG. 4, there is shown a perspective view of various embodiments of the duct support device in use. In one use, a combination of each embodiment shown in FIGS. 1A and 1B are used to simultaneously support multiple instances of distinct ductwork elements 41, such as when simultaneously installing a cold air return network and a hot air return network. It should be understood that either embodiment may be utilized independently as well. In such uses, a first duct support device 39 can be removably secured to a support structure 14, such as a joist, rafter, I-beam, or the like via the clamp assembly 12 as previously described elsewhere herein. Once properly secured, the user can adjust the position of the brace 24 via manipulation of the plurality of arms of the first duct support device 39 to ensure that the brace 24 rests against an exterior of the ductwork element 41 to retain the ductwork element 41 in a desired position for use. Similarly, a second duct support device 40 can be affixed to the support structure 14 via the clamp assembly 12. In the shown embodiment, the second duct support device 40 comprises the U-shaped arm structure described in association with FIG. 1B to allow the brace 24 to rest against an interior surface of the ductwork element 41 as shown. In this manner, the plurality of arms extend beyond a height of the ductwork element 41 sidewall, allowing the third and fourth arm members to position the brace 24 flush against the interior surface of the ductwork element 41. In order to facilitate this configuration, the user may further adjust the relative position of the plurality of arms to ensure the brace 24 maintains the ductwork element 41 in a desired position. Once supported by each of the first and second duct support devices 39, 40, the ductwork elements 41 can then be installed with minimal effort and manpower.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A duct support device, comprising:
   a clamp assembly having a channel dimensioned to removably secure to a support structure;
   wherein a width of the channel is selectively adjustable via actuation of a pair of clamp handles affixed to the clamp assembly;
   a first arm member affixed to the clamp assembly at a proximal end of the first arm member;
   a second arm member pivotally affixed to a distal end of the first arm member;
   a third arm member perpendicularly affixed to a distal end of the second arm member; and
   a brace affixed to the third arm member parallel to a longitudinal axis of the third arm member;
   wherein the brace extends along a length of an upper side of the third arm member;
   wherein the clamp assembly includes a base and a pair of wall members extending from opposing ends of the base defining the channel therebetween;
   wherein one of the pair of wall members is slidably disposed along the base and operably connected to the pair of clamp handles; and further comprising a groove disposed on an exterior surface of one of the pair of wall members; and
wherein the groove is dimensioned to slidably receive the proximal end of the first arm member therein.

2. The duct support device of claim 1, wherein a cross-sectional area of the brace in a plane parallel to the upper side of the third arm member is larger than a corresponding cross-sectional area of the upper side of the third arm member.

3. The duct support device of claim 1, further comprising a locking pin removably securable through coaxial apertures disposed through each of the first arm member and the second arm member, wherein the locking pin is configured to retain the first arm member at a desired angle relative to the second arm member.

4. The duct support device of claim 3, wherein the locking pin is affixed to the second arm member via a cable.

5. The duct support device of claim 1, wherein the brace extends along a length greater than half of a length of the third arm member.

6. The duct support device of claim 1, wherein a pad is affixed to an upper surface of the brace.

7. The duct support device of claim 6, wherein the pad extends along an entirety of the upper surface of the brace.

8. The duct support device of claim 1, further comprising a pair of plates, each plate affixed to an upper end of a respective wall member of the pair of wall members, wherein a portion of each plate overhangs the respective wall member such that a distance between the pair of plates is less than the width of the channel.

9. The duct support device of claim 1, further comprising an opening extending through one of the pair of wall members, wherein the opening is dimensioned to receive a portion of one of the pair of clamp handles therethrough when the clamp assembly is in an open position.

10. A duct support device, comprising:
a clamp assembly having a channel dimensioned to removably secure to a support structure;
wherein a width of the channel is selectively adjustable via actuation of a pair of clamp handles affixed to the clamp assembly;
a first arm member affixed to the clamp assembly at a proximal end of the first arm member;
a second arm member pivotally affixed to a distal end of the first arm member;
a third arm member perpendicularly affixed to a distal end of the second arm member;
a fourth arm member perpendicularly affixed to a distal end of the third arm member, such that the fourth arm member is parallel to the second arm member defining a U-shape; and
a brace affixed to a distal end of the fourth arm member, such that the brace is parallel to a longitudinal axis of the third arm member;
wherein the clamp assembly includes a base and a pair of wall members extending from opposing ends of the base defining the channel therebetween;
wherein one of the pair of wall members is slidably disposed along the base and operably connected to the pair of clamp handles; and
further comprising an opening extending through one of the pair of wall members;
wherein the opening is dimensioned to receive a portion of one of the pair of clamp handles therethrough when the clamp assembly is in an open position.

11. The duct support device of claim 10, further comprising a locking pin removably securable through coaxial apertures disposed through each of the first arm member and the second arm member, wherein the locking pin is configured to retain the first arm member at a desired angle relative to the second arm member.

12. The duct support device of claim 11, wherein the locking pin is affixed to the second arm member via a cable.

13. The duct support device of claim 10, further comprising a pair of pads affixed to opposing ends of an upper surface of the brace.

14. The duct support device of claim 10, further comprising a pair of plates, each plate affixed to an upper end of a respective wall member of the pair of wall members, wherein a portion of each plate overhangs the pair of respective wall member such that a distance between the pair of plates is less than the width of the channel.

15. The duct support device of claim 10, further comprising a groove disposed on an exterior surface of one of the pair of wall members, wherein the groove is dimensioned to slidably receive the proximal end of the first arm member therein.

* * * * *